US010771968B2

(12) United States Patent
Liu et al.

(10) Patent No.: US 10,771,968 B2
(45) Date of Patent: Sep. 8, 2020

(54) PHOTONIC AUTHENTICATION SYSTEM FOR A RECEIVER TERMINAL AND TRANSMITTER TERMINAL

(71) Applicant: KUANG-CHI INTELLIGENT PHOTONIC TECHNOLOGY LTD., Shenzhen (CN)

(72) Inventors: Ruopeng Liu, Shenzhen (CN); Silu Xu, Shenzhen (CN)

(73) Assignee: KUANG-CHI INTELLIGENT PHOTONIC TECHNOLOGY LTD., Shenzhen (CN)

(*) Notice: Subject to any disclaimer, the term of this patent is extended or adjusted under 35 U.S.C. 154(b) by 279 days.

(21) Appl. No.: 15/011,548

(22) Filed: Jan. 30, 2016

(65) Prior Publication Data
US 2016/0150411 A1 May 26, 2016

Related U.S. Application Data

(63) Continuation of application No. PCT/CN2014/082850, filed on Jul. 23, 2014.

(30) Foreign Application Priority Data

Jul. 31, 2013 (CN) .......................... 2013 1 0330112

(51) Int. Cl.
H04L 29/06 (2006.01)
H04W 12/06 (2009.01)
(Continued)

(52) U.S. Cl.
CPC ............ H04W 12/06 (2013.01); G06F 21/31 (2013.01); G07C 9/00309 (2013.01);
(Continued)

(58) Field of Classification Search
CPC ............. H04L 63/0428; H04L 63/0853; H04L 63/0435; H04L 9/3215; H04L 9/3234;
(Continued)

(56) References Cited

U.S. PATENT DOCUMENTS 7,492,258 B1  2/2009  Shoarinejad et al.
8,655,337 B2 * 2/2014  Sherlock ................. H04L 41/08
                                                             455/418

(Continued)

FOREIGN PATENT DOCUMENTS

CN    102750762 A    10/2012
CN    103198550 A    7/2013
(Continued)

OTHER PUBLICATIONS

Supplementary European Search Report dated Feb. 8, 2017 for EP14832231.6.

Primary Examiner — Farid Homayounmehr
Assistant Examiner — Lizbeth Torres-Diaz
(74) Attorney, Agent, or Firm — Armstrong Teasdale LLP

(57) ABSTRACT

The present application discloses an authentication system, and a transmit terminal, a receive terminal, and a right authentication method of same. The receiver externally propagates, by using the information transmit module, an identification code information set corresponding to the receiver. After receiving the identification code information set, the transmitter firstly performs a first right authentication on rights of the transmitter. The transmitter allows itself to transmit a light signal of an identification code of the transmitter only after the authentication is passed, thereby reducing a security risk caused by uncontrolled transmission of the light signal of the identification code of the transmitter by the transmitter. After the transmitter transmits the light signal of the identification code of the transmitter, the receiver performs a second right authentication on the (Continued)

received light signal. In this way, security of the authentication system is further improved.

9 Claims, 4 Drawing Sheets

(51) Int. Cl.
  *G06F 21/31* (2013.01)
  *G07C 9/00* (2020.01)
  *H04W 12/00* (2009.01)
  *H04L 9/32* (2006.01)
(52) U.S. Cl.
  CPC ...... *G07C 9/00571* (2013.01); *H04L 63/0853* (2013.01); *G07C 2009/00785* (2013.01); *H04L 9/32* (2013.01); *H04L 63/101* (2013.01); *H04W 12/00522* (2019.01)
(58) Field of Classification Search
  CPC ....... H04L 9/3273; H04L 63/101; H04L 9/32; H04L 63/18; G06F 21/31; G06F 21/44; G06F 21/445; G06F 21/35; G06F 21/43
  See application file for complete search history.

(56) References Cited

U.S. PATENT DOCUMENTS

| | | | |
|---|---|---|---|
| 9,780,874 B2 * | 10/2017 | Liu | ............ H04B 10/116 |
| 2006/0003739 A1 * | 1/2006 | Sasakura | ............ G06K 19/10 455/411 |
| 2008/0072296 A1 * | 3/2008 | Bensimon | ............ H04L 63/0428 726/4 |
| 2008/0232588 A1 * | 9/2008 | Christison | ......... H04N 21/43637 380/270 |
| 2009/0157530 A1 * | 6/2009 | Nagamoto | ............. G06Q 30/06 705/26.1 |
| 2012/0091202 A1 * | 4/2012 | Cohen | .................... G06Q 10/02 235/382 |
| 2013/0217332 A1 * | 8/2013 | Altman | ................. H04W 12/04 455/41.2 |
| 2013/0221091 A1 * | 8/2013 | Koo | ........................ G06F 16/13 235/375 |
| 2014/0086590 A1 * | 3/2014 | Ganick | ................ H04W 12/06 398/118 |
| 2014/0282961 A1 * | 9/2014 | Dorfman | ................ G06F 21/35 726/7 |
| 2016/0150411 A1 * | 5/2016 | Liu | .................... G07C 9/00571 726/4 |
| 2016/0277439 A1 * | 9/2016 | Rotter | ................... H04W 12/06 |
| 2017/0245147 A1 * | 8/2017 | Liu | ......................... G06F 1/163 |

FOREIGN PATENT DOCUMENTS

| | | |
|---|---|---|
| CN | 103825871 A | 5/2014 |
| EP | 1755074 A1 | 2/2007 |
| EP | 2166697 A1 | 3/2010 |
| EP | 2610821 A1 | 7/2013 |
| JP | 1992-302682 A | 10/1992 |
| JP | 1996-65776 A | 3/1996 |
| JP | 2000-152352 A | 5/2000 |
| JP | 2006-92327 A | 4/2006 |
| JP | 2012-123690 A | 6/2012 |
| WO | WO-2012005653 A1 * | 1/2012 ......... G06Q 20/3276 |

* cited by examiner

PHOTONIC AUTHENTICATION SYSTEM FOR A RECEIVER TERMINAL AND TRANSMITTER TERMINAL

CROSS REFERENCE TO RELATED APPLICATIONS

This application is a continuation of PCT Application No. PCT/CN2014/082850 filed on Jul. 23, 2014, which claims priority to Chinese Patent Application No. 201310330112.9 of Jul. 31, 2013, all of which are incorporated herein by reference.

TECHNICAL FIELD OF THE INVENTION

The present application relates to an authentication system, and in particular, to a photonic authentication system for modulating an identification code into a light signal and authenticating the light signal.

BACKGROUND OF THE INVENTION

Currently, a common authentication system generally includes a receive terminal and a transmit terminal, where rights are set for the transmit terminal, and the receive terminal receives authentication information transmitted by the transmit terminal, authenticates the transmit terminal, and after the authentication is passed, may allow the transmit terminal to perform an operation on the receive terminal. For example, in an access control system, all related technical solutions use a contactless proximity card such as an RFID (radio frequency) card or an IC card to perform a security authentication. The access control system using a proximity card for working is a proximity card access control system. The proximity card access control system transfers information to a card reader by using a proximity card. The card reader then transfers the proximity card information to an access controller. The access controller determines whether the card is a valid card, and transmits a determining result to the card reader. If the card is a valid card, the card reader gives out a "beep", which represents that the card is a valid card, and meanwhile, the access controller unlocks an electric lock to open a door. When the card is an invalid card, the card reader does not perform any action and does not give out any sound, and the electric lock does not make any response. However, with continuous development of cracking technologies, currently, all RFID cards can be easily cracked, card information is replicated, and therefore a severe security problem exists. It is more difficult to crack an IC card. However, a method capable of cracking is also available currently, and the security problem still exists.

In addition to the foregoing proximity card access control system, some systems that transmit signals by using visible light begin to be applied. An access control system of this type mainly performs wireless information transmission by means of visible light. The system performs communication by flashing an LED light source at a high frequency, and generally includes a transmitter and a receiver. At the transmitter, an LED emits light and flashes at a frequency invisible to a human's eye, where in a specific period of time, presence of light indicates a binary signal "1", and absence of light indicates a binary signal "0". At the receiver (equivalent to a card reader), the light signal is converted into an electrical signal by using a photoelectric conversion component such as a photoresistor, and decoding is performed to obtain a corresponding card signal. Then the card signal is transferred to an access controller, and the access controller determines whether the transmitter has a right to open a door, and thereby determines whether to unlock the door. The foregoing solution in which visible light is used to perform short-range communication to transmit information of a transmitter is also feasible. However, because visible light can be emitted by only the triggered transmitter, and the light signal is transmitted by fast flashing, the light signal may be photographed by a high-speed camera, and visible light flashing information is obtained, and then transmitted information content is obtained by analyzing changes of flashing. Even if the information content is encrypted by the transmitter, the photographed content may also be illegally replicated, and a same transmit apparatus is made for transmitting the replicated light signal, and thereby the door of the photonic access control system can also be unlocked. Therefore, a security risk also exists.

SUMMARY

The present application provides an authentication system, and a transmit terminal, a receive terminal, and a right authentication method, so as to prevent a transmit apparatus that is replicated illegally and improve security of the authentication system.

According to a first aspect of the present application, the present application provides an authentication system, including a transmit terminal, a receive terminal, and a management server, where the transmit terminal includes a transmitter, the receive terminal includes a receiver and a controller, and the controller is communicatively connected to the receiver and the management server respectively. The management server stores an identification code information set corresponding to each receiver. The receiver includes an information transmit module and a light receive module, where the information transmit module and the light receive module are communicatively connected to the controller respectively. The information transmit module externally propagates the acquired identification code information set. The light receive module performs at least photoelectric conversion after receiving a light signal from the transmitter, and outputs transmitter information to the controller. The controller performs a second right authentication on the transmitter information after receiving the transmitter information. The transmitter includes a processor, an information receive module, and a light transmit module, where the processor is connected to the information receive module and the light transmit module respectively. The information receive module transmits the identification code information set to the processor after receiving the identification code information set transmitted by the information transmit module, and the processor performs, according to the received identification code information set, a first right authentication on whether the transmitter has operation rights, and controls an enable state of the light transmit module according to an authentication result.

In an embodiment, the identification code information set includes unique identification code information of all transmitters corresponding to the receiver. The processor compares a unique identification code of the transmitter with the received identification code information set. If the received identification code information set includes an identification code that is the same as the unique identification code of the transmitter, the processor controls the light transmit module to switch to a working state that allows converting transmitter information of the transmitter into a light signal for transmission. Otherwise, the processor controls the light transmit module to be in a working state that forbids converting transmitter information of the transmitter into a light signal for transmission, where the transmitter information includes at least the unique identification code of the transmitter. After receiving the transmitter information, the controller compares the unique identification code in the transmitter information with the identification code information set, and passes the first right authentication when determining that the identification code information set includes the unique identification code.

According to a third aspect of the present application, the present application provides a receive terminal, where the receive terminal includes a receiver and a controller, and the receiver includes an information transmit module and a light receive module, where the information transmit module and the light receive module are communicatively connected to the controller respectively, the information transmit module externally propagates an identification code information set, the light receive module performs at least photoelectric conversion after receiving a light signal from a transmitter, and outputs transmitter information to the controller, and the controller performs a second right authentication on the transmitter information after receiving the transmitter information.

According to a fourth aspect of the present application, the present application provides a method for right authentication in an authentication system, where the authentication system includes a transmit terminal and a receive terminal, where the transmit terminal includes a transmitter, the receive terminal includes a receiver and a controller that are connected, and the method includes: externally propagating, by the receiver, an acquired identification code information set corresponding to the receiver; after receiving the identification code information set transmitted by the receiver, performing, by the transmitter according to the received identification code information set, a first right authentication on whether the transmitter has operation rights; and determining, according to an authentication result, whether to allow converting transmitter information of the transmitter into a light signal for transmission, where the transmitter information includes at least a unique identification code of the transmitter; and after the receive terminal receives the transmitter information that is transmitted by the transmitter in a light signal form by using the light receive module, performing a second right authentication on the transmitter information, by the controller.

In an embodiment, the authentication system is an access control system, and after the second right authentication is performed on the transmitter information, the controller determines, according to an authentication result, whether to output an unlocking control signal.

According to a fifth aspect of the present application, the present application provides a right authentication method for a transmit terminal, including: receiving an identification code information set transmitted by a receiver; performing, according to the received identification code information set, a first right authentication on whether the transmit terminal has operation rights; and determining, according to an authentication result, whether to allow converting transmitter information of the transmit terminal into a light signal for transmission, where the transmitter information includes at least a unique identification code corresponding to the transmit terminal.

According to a sixth aspect of the present application, the present application provides a right authentication method for a receive terminal, including: externally propagating an identification code information set by a receiver; and after the receive terminal receives, by using a light receive module, transmitter information that is transmitted by a transmitter in a light signal form, performing, by a controller, a second right authentication on the transmitter information.

In the present application, an information transmit module and a light receive module are disposed in a receiver of an authentication system, and an information receive module and a light transmit module are disposed in a transmitter. The receiver externally propagates, by using the information transmit module, an identification code information set corresponding to the receiver. Only when the transmitter enters a propagation range of the receiver, can the transmitter receive the identification code information transmitted by the receiver. The transmitter firstly performs a first right authentication on whether the transmitter has operation rights. The transmitter allows itself to transmit a light signal of a unique identification code of the transmitter only when the transmitter has operation rights, that is, only when the transmitter has rights to operate the receiver, thereby reducing a security risk caused by uncontrolled transmission of the light signal of the identification code of the transmitter by the transmitter. After the transmitter transmits the light signal of the identification code of the transmitter, the receiver performs a second right authentication on the received light signal. In this way, security of the authentication system is further improved.

DESCRIPTION OF EMBODIMENTS

The following further describes the present invention by using embodiments with reference to accompanying drawings.

Figure 1:
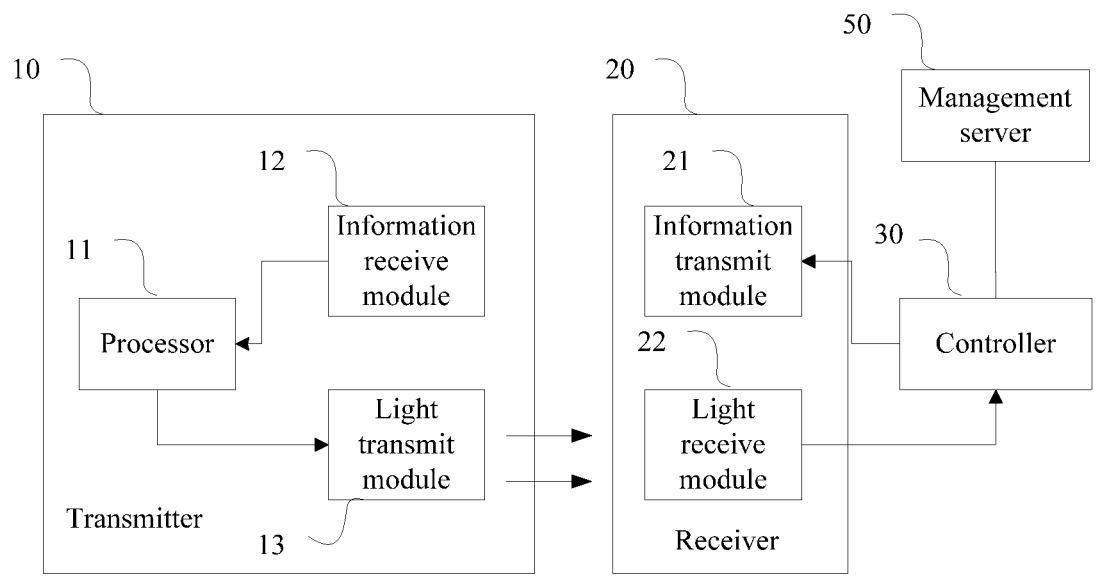
FIG. 1 is a schematic structural diagram of an embodiment of the present application.

An authentication system in the present application may be applied to an access control system, or may be applied to a system that requires authorization such as a consumption management system, a transaction system, or a metro system, where the consumption management system may be a system that requires authorization of a voucher, ticket management, a discount coupon, or a membership card, or the like. As shown in FIG. 1, the authentication system includes a transmit terminal, a receive terminal, and a management server 50, where the transmit terminal includes a transmitter 10, the receive terminal includes a receiver 20 and a controller 30. The controller 30 is communicatively connected to the receiver 20 and the management server 50 respectively, where the management server 50 stores an identification code information set corresponding to each receiver.

The receiver 20 includes an information transmit module 21 and a light receive module 22, where the information transmit module 21 and the light receive module 22 are communicatively connected to the controller 30 respectively. The transmitter 10 includes a processor 11, an information receive module 12, and a light transmit module 13, where the processor 11 is connected to the information receive module 12 and the light transmit module 13 respectively. A working process of the authentication system is: the receiver 20 externally propagates, by using the information transmit module 21, acquired identification code information corresponding to the receiver; after receiving, by using the information receive module 12, an identification code information set transmitted by the receiver, the transmitter 10 transfers the identification code information set to the processor 11; the processor 11 performs, according to the received identification code information set, a first right authentication on whether the transmitter has operation rights, and determines, according to an authentication result, whether to allow converting transmitter information of the transmitter into a light signal for transmission by using the light transmit module 13, where the transmitter information includes at least a unique identification code of the transmitter; and after the receive terminal receives the transmitter information that is transmitted by the transmitter in a light signal form by using the light receive module 22, the receive terminal transfers the transmitter information to the controller 30; the controller 30 performs a second right authentication on the transmitter information, and performs an action according to an authentication result. For example, according to the authentication result, the controller determines whether to output a corresponding control signal. According to different applications of the authentication system, functions of control signals output by the controller also vary. For example, when the authentication system is an access control system, a consumption management system, or a metro system, the authentication system further includes an access control switch apparatus configured to switch between an on state and an off state, the controller is further communicatively connected to the access control switch apparatus, and after performing the second right authentication on the transmitter information, the controller determines, according to the authentication result, whether to output a control signal to the access control switch apparatus, where a function of the control signal may be to control turn-on of the access control switch apparatus of the authentication system (for example, control a controllable lock to unlock or control a gate to open). When the authentication system is a transaction system, the transaction system further includes a cash register, a POS machine, or a computer, the controller is further communicatively connected to the cash register or the POS machine, and after performing the second right authentication on the transmitter information, the controller determines, according to the authentication result, whether to output a cash control signal to the cash register, the POS machine, or the computer, where a function of the control signal is to control the cash register, the POS machine, or the computer to receive money according to a predetermined manner.

Embodiment 1

In this embodiment, an authentication system is an access control system, which is used as an example for description, where a management server is an access control management server, and a controller is an access controller.

Figure 2A:
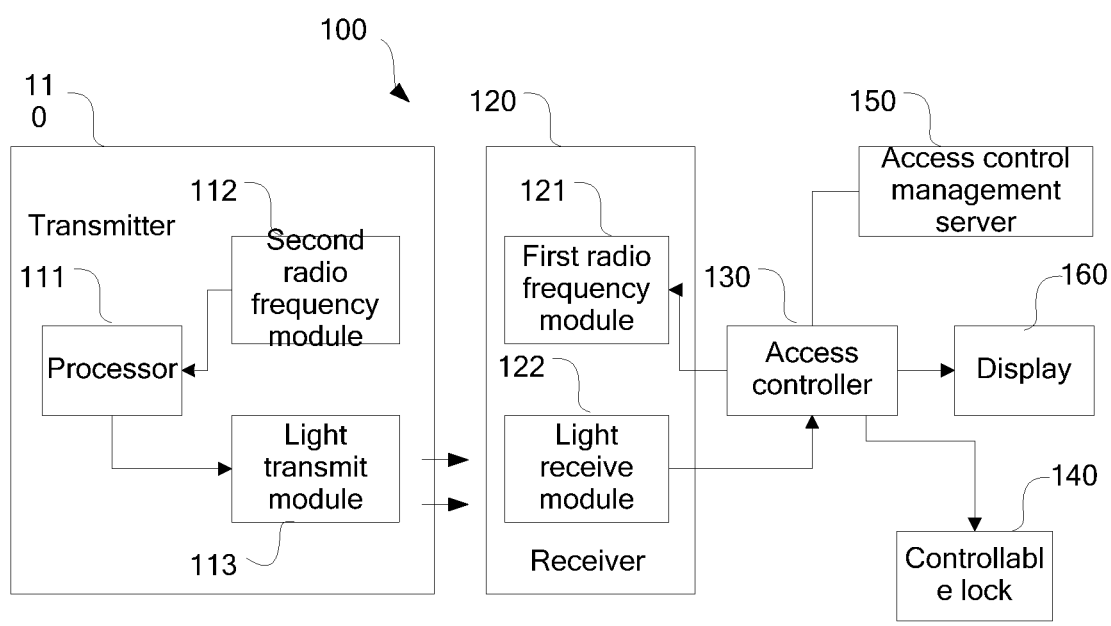
FIG. 2a is a schematic structural diagram of an access control system according to an embodiment of the present application.

Referring to FIG. 2a, an access control system 100 includes a transmit terminal and a receive terminal. In this embodiment, the transmit terminal is a transmitter 110, and the receive terminal includes a receiver 120 and an access controller 130. In order to control a door, the access control system 100 further includes an access control switch apparatus configured to switch between an on state and an off state. In this embodiment, the access control switch apparatus is a controllable lock 140; in other embodiments, the access control switch apparatus may be a gate. For ease of management of the access control system, the access control system 100 further includes an access control management server 150, where the access control management server 150 stores unique identification code information of all transmitters corresponding to each receiver. The unique identification code information of all the transmitters corresponding to each receiver may be the same or different. The access controller 130 is communicatively connected to the receiver 120, the access control management server 150, and the controllable lock 140 respectively, where the communication connection manner may be a wired connection or a wireless communication connection. For ease of displaying information, the access control system 100 further includes a display 160, where the display 160 is connected to the access controller 130 and displays information output by the access controller 130. In this embodiment, the access controller 130 may acquire information from the access control management server 150; the access controller 130 may also transmit data to the receiver 120 or control the receiver 120 to execute an instruction; the access controller 130 may further control the controllable lock 140 to change the current state, for example, control the controllable lock 140 to change to an unlocked state or a locked state. The controllable lock 140 may be an electric lock whose unlocking or locking is controlled by an electrical signal, or may be a lock controlled in other manners.

In this embodiment, the transmitter 110 may convert its unique identification code into a light signal for transmission. When the transmitter 110 transmits a light signal to the receiver 120, the receiver 120 converts the received light signal into an electrical signal, and outputs the electrical signal to the access controller 130; the access controller 130 performs an authentication according to the electrical signal including the identification code of the transmitter 110, determines whether the transmitter 110 has a right to open a controlled door controlled by the receiver 120, and if the transmitter 110 has the right, outputs a control signal to control unlocking of the controllable lock.

In this embodiment, the receiver 120 includes a first radio frequency module 121 used as an information transmit module, and a light receive module 122, where the first radio frequency module 121 and the light receive module 122 are communicatively connected to the access controller 130. The first radio frequency module 121 may convert information transmitted by the access controller 130 into a radio frequency signal for transmission. Certainly, in other embodiments, the first radio frequency module 121 may further receive a radio frequency signal, and transmit the radio frequency signal to the access controller 130 after performing corresponding processing. The light receive module 122 may receive a light signal, and convert the light signal into an electrical signal for outputting to the access controller 130. The transmitter 110 includes a processor 111, a second radio frequency module 112 used as an information receive module, and a light transmit module 113, where the processor 111 is connected to the second radio frequency module 112 and the light transmit module 113 respectively.

The second radio frequency module 112 may receive a radio frequency signal, and transmit the radio frequency signal to the processor 111 after performing corresponding processing. Certainly, in other embodiments, the second radio frequency module 112 may further externally transmit a radio frequency signal. The light transmit module 113 may convert the electrical signal output by the processor 111 into a light signal for transmission.

In this embodiment, the access controller 130 periodically or randomly obtains an identification code information set corresponding to the receiver 120 from the access control management server 150, where the identification code information set includes unique identification codes of all transmitters 110 corresponding to (that is, having a right to open a door controlled by the receiver) the receiver, and transmits the identification code information set to the receiver 120; after receiving the identification code information set from the access controller 130, the first radio frequency module 121 of the receiver 120 performs processing as required, for example, encrypts the identification code information set, and after processing, externally propagates the identification code information set continuously or intermittently in a radio frequency manner in a range (for example, in a rage of several meters).

When the transmitter 110 enters the range, the second radio frequency module 112 may receive the radio frequency signal transmitted by the first radio frequency module 121. The second radio frequency module 112 performs processing on the identification code information set transmitted by the first radio frequency module 121 as required, for example, performs decryption. After the processing, the second radio frequency module 112 sends the identification code information set to the processor 111. The processor 111 performs first right authentication on whether the transmitter has a right to operate the controllable lock controlled by the receiver according to the received identification code information set, and controls an enable state of the light transmit module 113 according to an authentication result. And when the authentication is passed, the light transmit module 113 is controlled to be in a state in which a light signal can be transmitted, or when the authentication is not passed, the light transmit module 113 is controlled to be in a state in which a light signal cannot be transmitted. In this embodiment, a specific authentication scheme is: the processor 111 compares the unique identification code of the transmitter 110 with the received identification code information set, then determines whether to allow converting transmitter information of the transmitter into a light signal for transmission, according to a comparison result, where the transmitter information includes at least the unique identification code of the transmit terminal And if the received identification code information set includes an identification code that is the same as the unique identification code of the transmitter, it considers that the transmitter has a right to open the controlled door, and controls the light transmit module 113 to switch to a working state that allows converting the transmitter information of the transmitter into a light signal for transmission. After switching to the working state that allows work, the light transmit module 113 may convert the transmitter information of the transmitter into a light signal for transmission, or otherwise, control the light transmit module 113 to be in a working state that forbids converting transmitter information of the transmitter into a light signal for transmission or to maintain an original state. In other embodiment, the identification code information set may be other information, and different authentication methods may be used for the first right authentication according to different identification code information sets. For example, the identification code information set includes identity information of the receive terminal, the transmitter 110 stores identity information of all receive terminals that the transmitter has rights to operate. And a method of the first right authentication may further be: comparing the received identification code information set with the identity information of all the receive terminals that the transmitter 110 has the rights to operate which is stored by the transmitter 110 by the processor 111. If the identity information of all the receive terminals that the transmitter 110 has the rights to operate which is stored by the transmitter 110 includes the identification code information set, it is considered that the transmitter has a right to open the controlled door, and the light transmit module 113 is controlled to switch to a working state that allows converting the transmitter information of the transmitter into a light signal for transmission, or otherwise, the light transmit module 113 is controlled to be in a working state that forbids converting the transmitter information of the transmitter into a light signal for transmission or to maintain an original state, where the transmitter information includes at least the unique identification code of the transmitter.

The light receive module 122 of the receiver 120 performs photoelectric conversion after receiving a light signal from the light transmit module 113, and outputs an electrical signal of the transmitter information to the access controller 130. The access controller 130 performs a second right authentication on the transmitter information after receiving the transmitter information, and determines, according to an authentication result, whether to output a control signal for controlling unlocking of the controllable lock. In this embodiment, an authentication method may be, for example, comparing the transmitter information with the identification code information set, and if the identification code information set includes the transmitter information, outputting a first control signal to the controllable lock to control unlocking of the controllable lock. In another embodiment, the authentication method may be further including right information of the transmitter for each controlled door into the transmitter information; the access controller 130 determines, according to the right information after receiving the transmitter information, whether the transmitter has a right to open the controlled door controlled by the receiver, and if yes, outputs a control signal to control unlocking of the controllable lock.

Figure 2B:
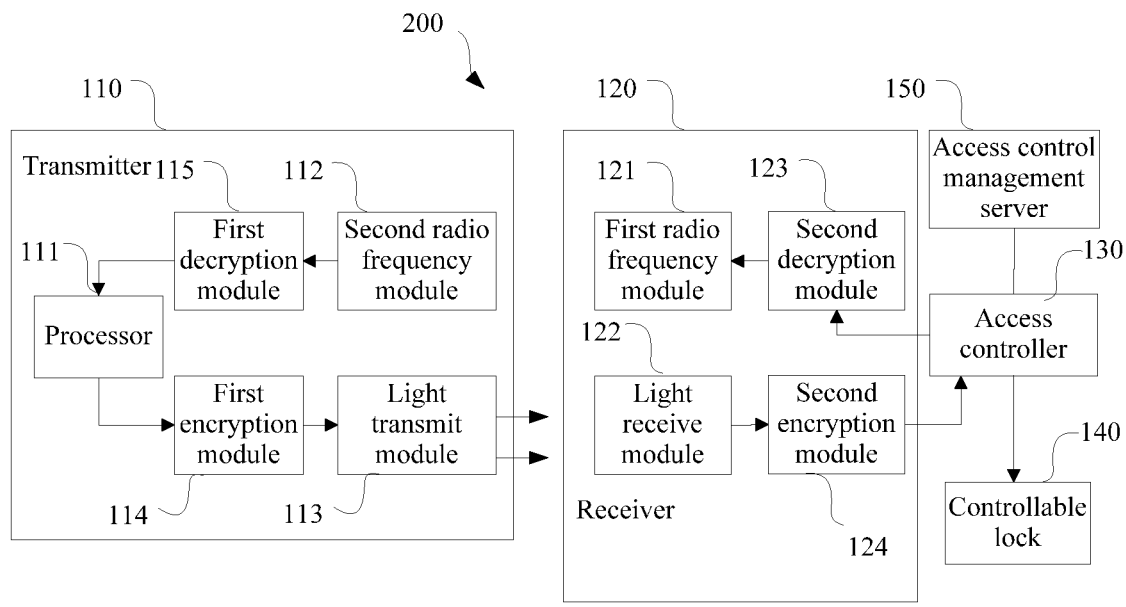
FIG. 2b is a schematic structural diagram of an access control system according to another embodiment of the present application.

As shown in a schematic structural diagram of an access control system 200 in FIG. 2b, when it is necessary to perform encryption and decryption processing on an identification code, a first decryption module 115 and a first encryption module 114 may be added to a transmitter 110. The first decryption module 115 is connected between a processor 111 and a second radio frequency module 112, and decrypts an identification code information set received by the second radio frequency module 112, and outputs the decrypted identification code information set to the processor 111; the first encryption module 114 is configured to encrypt transmitter information of the transmitter, and the first encryption module 114 is connected between the processor and a light transmit module. A second encryption module 123 and a second decryption module 124 may be added to a receiver 120. The second encryption module 123 is connected between an access controller 130 and a first radio frequency module 121, and encrypts the identification code information set received from the access controller 130 and outputs the encrypted identification code information set to the first radio frequency module 121; the second decryption module 124 is connected between a light receive module 122 and the access controller 130, and performs signal decryption after receiving a signal obtained through photoelectric conversion and output by the light receive module 122, and then outputs the signal to the access controller 130.

In an actual use process, a transmitter is generally carried by a user, and a receiver is generally installed beside a controlled door. A controllable lock is installed on the controlled door. The controllable lock controls, by switching a state of the controllable lock, whether to allow or forbid the controllable door to open. An access control management server may be disposed in a secure place, for example, an administrator's office or an equipment room. An access controller performs data communication with the access control management server by using a wired communication network or a wireless communication network. A working process of this embodiment is as follows:

A receiver periodically obtains unique identification codes of all transmitters that currently have a right to open a door corresponding to the receiver from a database of an access control management server by using an access controller. Then all the identification codes are encrypted, and are propagated in a small range of several meters in a radio frequency manner by using a radio frequency transmit module of the receiver.

2. When a transmitter approaches the receiver near the door, the transmitter enters a radio frequency propagation range, and starts to receive a signal propagated in the radio frequency manner.

3. The transmitter decrypts the received signal propagated in the radio frequency manner, and checks whether a code that is the same as a unique identification code of the transmitter exists in the decrypted signal. If a code that is the same as the unique identification code of the transmitter exists, it indicates that the transmitter has the right to open the door corresponding to the receiver. When a user presses a button, a visible light transmit module is started, transmitter information is dynamically encrypted, and the transmitter information is transmitted in a visible light form by using the visible light transmit module.

4. When the receiver receives the visible light signal, the receiver performs photoelectric conversion by using a visible light receive module, obtains the transmitter information that is encrypted by using a dynamic key, and then decrypts the signal content by using a dynamic key that is generated according to the same previous algorithm, and obtains the original transmitter information. After the transmitter information is obtained, the receiver sends the transmitter information to the access controller. The access controller determines rights of the transmitter for a second time to determine whether the transmitter is legal. If the transmitter is legal, a controllable lock is unlocked. If the transmitter is illegal, the controllable lock is not unlocked, and a prompt indicating that the transmitter is illegal is provided.

5. After the signal propagated in the radio frequency manner is decrypted, if the transmitter does not find a code correspond with the unique code of the device, it indicates that the transmitter does not have the right to unlock the door corresponding to the current receiver. Then even if the user presses a start button in the propagation range of the receiver, the transmitter does not start the visible light transmit module, and therefore no visible light signal is transmitted, and the access controller does not perform any action.

Apparently, in the technical solution of this embodiment, only when a transmitter determines that a received identification code information set includes an identification code that is the same as a unique identification code of the transmitter, that is, only when the transmitter approaches a controlled door and has a right to open the controlled door, can a user operate the transmitter, so that the transmitter transmits a light signal converted from the identification code. If the two conditions are not satisfied, the transmitter does not transmit any light signal converted from the identification code, thereby it reduces a security risk caused by replication by using a high-speed camera by other people. After the transmitter transmits a light signal, after a receive terminal receives the light signal, the receive terminal performs a right authentication once again on the transmitter (namely, an emitter) that transmits the light signal. The transmitter is allowed to open the controlled door only when the two authentications are both passed. Therefore, in this embodiment, two authentications are performed on whether the transmitter has the right to open the controlled door, and thereby security of the access control system is further improved.

In this embodiment, an information transmit module obtains an identification code information set from an access control management server by using an access controller. In other embodiments, an information transmit module may further obtain an identification code information set from an access control management server directly.

In other embodiments, an information transmit module of a receiver may further use other wireless manners to transmit information. For example, the information transmit module may be a Wi-Fi transmit module, an infrared transmit module, a Bluetooth transmit module, or a low-frequency electromagnetic wave transmit module; correspondingly, an information receive module of a transmitter may also be a Wi-Fi receive module, an infrared receive module, a Bluetooth receive module, or a low-frequency electromagnetic wave receive module.

Embodiment 2

Figure 3:
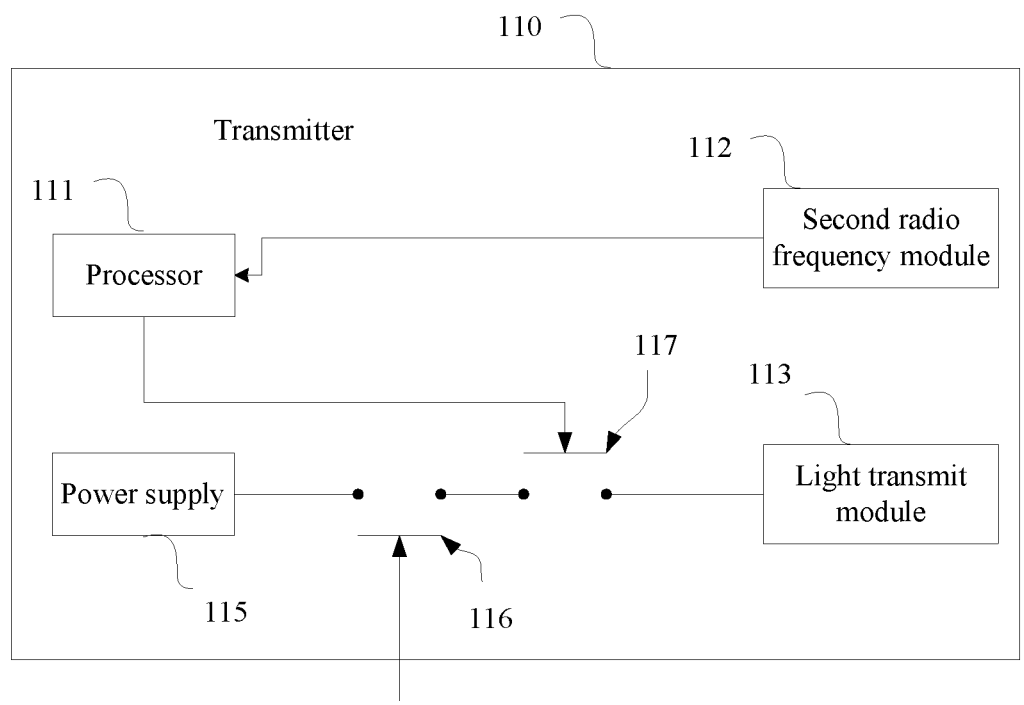
FIG. 3 is a schematic structural diagram of a transmitter according to still another embodiment of the present application.

Referring to FIG. 3, different from the foregoing embodiment, a transmitter 110 further includes a power supply 115, a trigger switch 116, and a control switch 117, where the trigger switch 116 and the control switch 117 are wired in series between the power supply 115 and a light transmit module 113. A control end of the control switch 117 is coupled to a processor 111, and the control switch switches between an on state and an off state according to a control signal output by the processor 111. When the processor 111 determines that a received identification code information set includes an identification code that is the same as a unique identification code of the transmitter, the processor 111 controls the control switch 117 to be on; or otherwise, and controls the control switch 117 to be off. The trigger switch 116 is configured to switch between an on state and an off state in response to an operation of a user. Therefore, only when both the trigger switch 116 and the control switch 117 are in the on state, can the light transmit module 113 connect the power supply for working.

In some cases, a user passes through a propagation range of a receiver, but does not need to open a controlled door. Therefore, the user does not need to trigger the transmitter to transmit a light signal. To prevent the control switch 117 from always being in the on state in this case, a timer may be started immediately after the processor 111 determines that the received identification code information set includes the identification code that is the same as the unique identification code of the transmitter. After the timer expires, the control switch 117 is controlled to be off.

Certainly, in other embodiments, a person skilled in the art may also use other manners, based on the content disclosed by the present application, to control the light transmit module 113 to switch between a state of allowing work and a state of forbidding work. For example, a switch is disposed on a transmission path on which the processor 111 transmits the identification code of the transmitter to the light transmit module 113, where the state of the switch is controlled by the processor 111. Likewise, transmission of the identification code by the light transmit module 113 may also be controlled.

Figure 4:
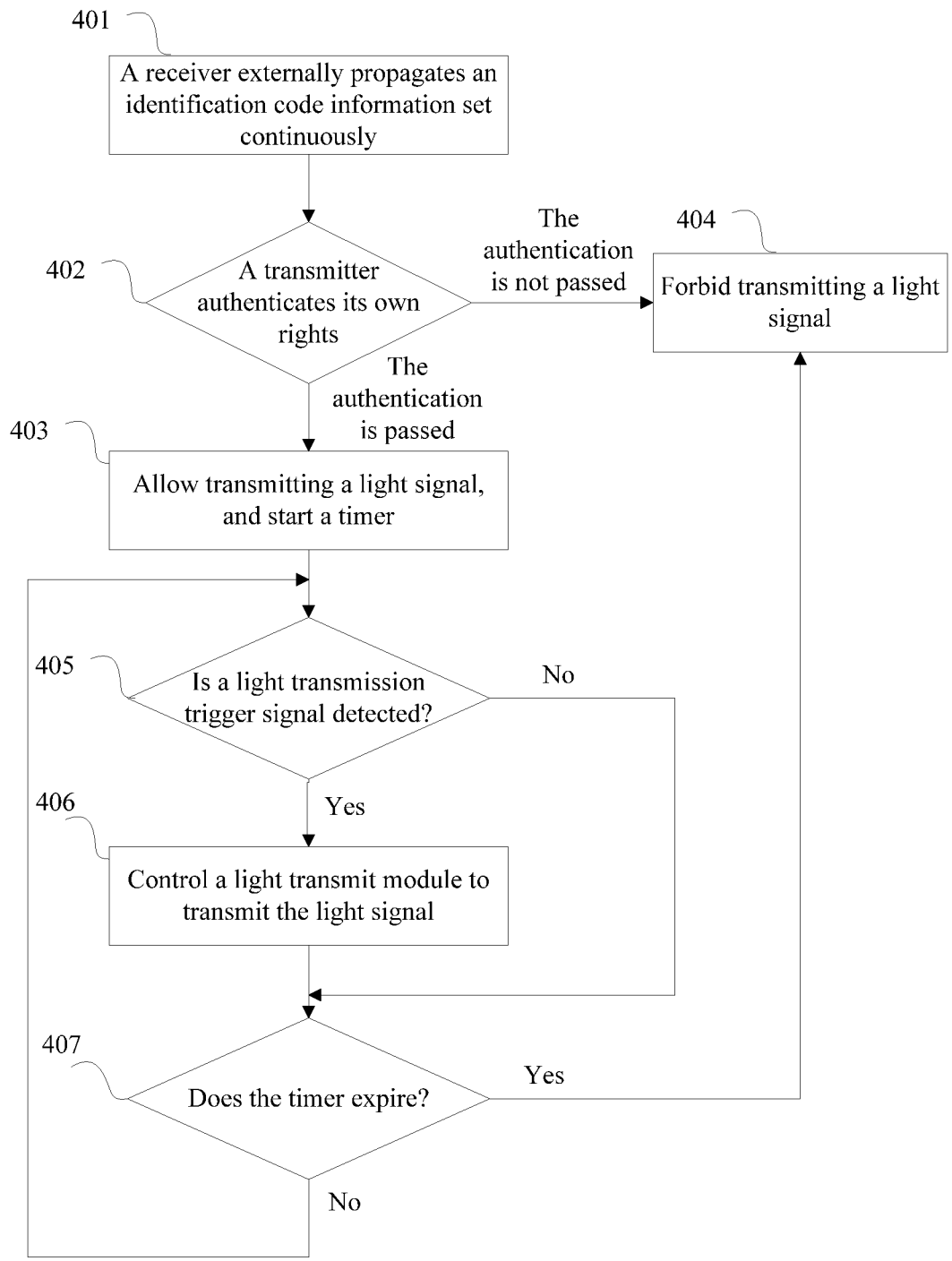
FIG. 4 is a flowchart of a first right authentication in an access control system according to an embodiment of the present application.

To enhance the security of an access control system and to enable the transmitter 110 to convert, only in a controllable state, its unique identification code into a light signal for transmission, when the access control system performs a right authentication in this embodiment, steps of transmitting a light signal and performing timing control based on a user trigger are further added on a basis of a second authentication. At a transmit terminal, firstly a transmitter performs a first authentication on whether the transmitter has a right to open a controlled door, where a process is shown in FIG. 4, and the process includes the following steps:

Step 401: A receiver externally propagates an acquired identification code information set corresponding to the receiver continuously or intermittently, where the identification code information set includes unique identification code information of all transmitters corresponding to the receiver.

Step 402: A transmitter authenticates its own rights. After receiving the identification code information set transmitted by the receiver, the transmitter compares a unique identification code of the transmit terminal with the received identification code information set, passes the right authentication if the received identification code information set includes an identification code same as the unique identification code of the transmit terminal, and performs step 403; or otherwise, performs step 404 to forbid converting transmitter information of the transmitter into a light signal for transmission by using a light transmit module, or may maintain an original state.

Step 403: The transmitter allows converting the transmitter information of the transmitter into a light signal for transmission by using the light transmit module, and at the same time, starts a timer.

Step 405: The transmitter detects whether a user inputs a light transmission trigger signal, and if yes, performs step 406, or otherwise performs step 407.

Step 406: The transmitter controls, according to the light transmission trigger signal, the light transmit module to convert the transmitter information of the transmit terminal into a light signal for transmission.

Step 407: The transmitter determines whether the timer expires, and if the timer expires, performs step 404, or otherwise, continues to perform step 405.

By controlling a timer in this embodiment, the transmitter is forbidden to transmit a light signal again after a set time expires after the transmitter passes its own authentication; the transmitter is allowed to transmit a light again after the transmitter passes its own authentication again, where a validity period is specified for authenticating the transmitter. In this way, security of the authentication system is further improved.

Figure 5:
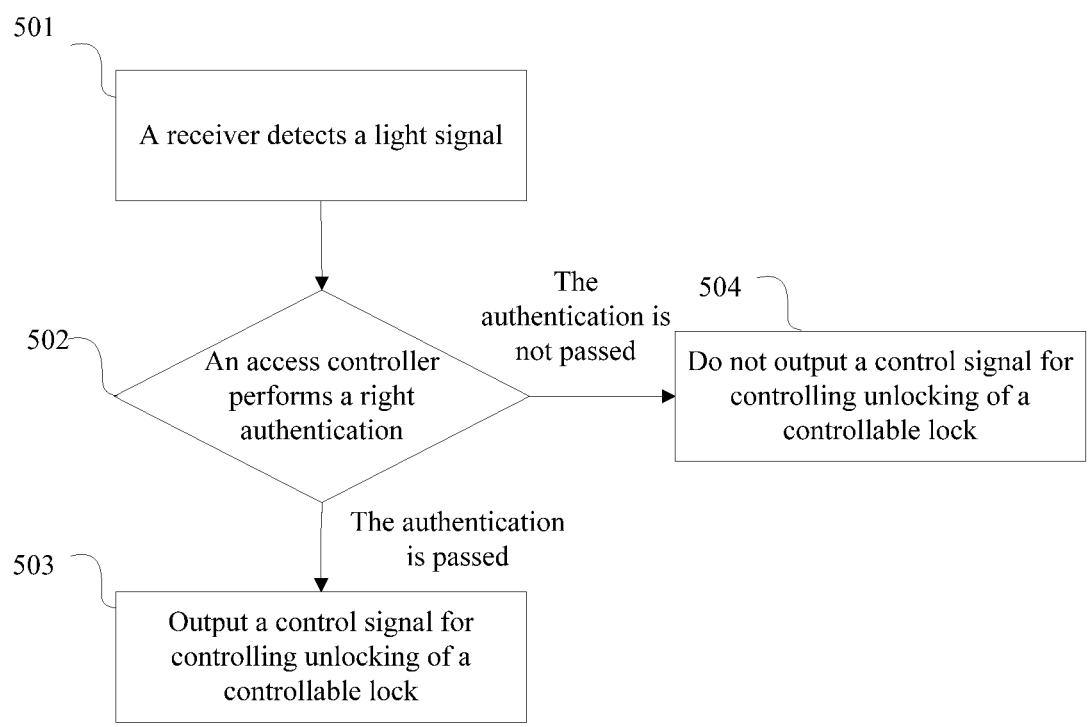
FIG. 5 is a flowchart of a second right authentication in an access control system according to an embodiment of the present application.

At a receive terminal, a second authentication is performed on whether a transmitter has a right to open a controlled door. A process executed by the receive terminal is shown in FIG. 5, and includes the following steps:

Step 501: A receiver detects a light signal by using a light receive module; when receiving transmitter information that is transmitted by a transmitter in a light signal form, performs photoelectric conversion on the transmitter information, and then sends the transmitter information to an access controller.

Step 502: The access controller performs a right authentication on the transmitter information, and if the authentication is passed, performs step 503, or otherwise performs step 504. That the access controller performs a right authentication on the transmitter information includes: comparing the transmitter information with an identification code information set stored by the access controller, and outputting a control signal for controlling unlocking of a controllable lock when determining that the identification code information set includes the transmitter information; or checking, by the receive terminal, whether the transmitter information includes a right to open a controlled door controlled by the receive terminal, and if yes, outputting a control signal for controlling unlocking of a controllable lock.

Step 503: Output the control signal for controlling unlocking of the controllable lock to control unlocking of the controllable lock.

Step 504: Do not output the control signal for controlling unlocking of the controllable lock, so that the controllable lock maintains a locked state.

Embodiment 3

Generally, when software is installed in a mobile phone, a password used as an access identification code is loaded into an SD card of the mobile phone in a text form for use. To change the password, it is only necessary to generate a new password on a computer and save the new password to a text file, and then replace old text information in the SD card of the mobile phone. With the increase of users in a photonic access control system, this manner already cannot meet market requirements, and there is a risk of leakage when a password is stored in an SD card of a mobile phone.

The access control system in this embodiment further includes an identification code allocation server. When a transmitter is a mobile terminal, the mobile terminal performs data communication with the identification code allocation server by using one or more information networks. The network may be at least one of the Internet, a local area network, a Wi-Fi network, and a mobile communication network (GSM, CDMA, WCDMA, TD-LTE, LTE, or the like). A method for acquiring an identification code by the mobile terminal is: sending an identification code acquisition request to the identification code allocation server through the Internet or local area network, where the identification code acquisition request includes information associated with the mobile terminal, so that the identification code allocation server sends a unique identification code to the mobile terminal associated with the request according to the identification code acquisition request. The identification code acquisition request may be transmitted by a requester by using the mobile terminal, or may be transmitted by an administrator by using an access control system platform.

In an embodiment, when software is installed in a mobile terminal, a valid password or a null password may be included therewith. After the software is installed in the mobile terminal, the mobile terminal sends an identification code acquisition request to the identification code allocation server. And the identification code allocation server sends a unique identification code corresponding to the mobile terminal to the mobile terminal by using SMS according to the request. The foregoing right information is received manually on the mobile terminal. A user sets an unlocking right ID (encrypted) on the mobile terminal according to the received identification code, and writes the unlocking right ID into the mobile terminal. Thereby, users are allowed to set correct passwords by themselves.

Considering uniqueness, confidentiality, and controllability features of identification codes, the identification code allocation server allocates only one identification code for each identification code acquisition request.

In the following description, a mobile terminal is a mobile phone, which is as an example to describe a process in which the mobile terminal acquires an identification code from an identification code allocation server through a local area network or the Internet.

S101. Configure a database, create a database instance, and create a database table for storing an identification code (hereinafter referred to as an ID for short).

S102. Implement an ID allocation function by using a popular three-layer architecture webservice+Spring+Hibernate of a Java platform website, implement an ID management function of the website by using a three-layer architecture Struts+Spring+Hibernate, and perform source encryption and channel encryption on communication data, where an AES encryption algorithm is used for source encryption, and an SSL encryption algorithm is used for channel encryption.

S103. A login portal must be set before a mobile phone communicates with a server in a local area network or the Internet. For example, a Wi-Fi router is connected to the local area network, and then the mobile phone is connected to the Wi-Fi router. Alternatively, an Internet router is connected to the Internet, and then the mobile phone is connected to the Internet router.

S104. To ensure security of an administrator, the administrator must log in to a website of an identification code allocation server by using a password, and can change the password. This password is static, that is, the password for login each time is consistent.

S105. Determine whether the password is consistent. If the password is consistent, it indicates that the one currently logging in is an administrator. If the password is inconsistent, an input error may occur, or the one currently logging in is not an administrator. To avoid a third-party attack, the number of allowed password retries is set to 5, so that an account is locked if the number of password retries exceeds 5. Each administrator maintains a login password. A length, complexity, and periodicity of the password may be set. For example, the length of the password can be set to 10 characters, including numbers, letters, and special symbols, and the password should be changed every month. If the administrator forgets the password, the administrator may tell a cloud administrator to reset the password.

S106. A user clicks an "Acquire ID" button on a mobile phone photonic client, and then the administrator can prompt, on the website of the server, that a mobile phone is acquiring an ID.

S107. To allow only one mobile phone to acquire an ID each time, the quantity of allocated IDs is set to one. When a mobile phone is acquiring an ID, it is possible that another illegal user that has downloaded mobile phone software is also acquiring an ID. For example, user A is a dweller in a community, user B is not a dweller in the community, and user B clicks "Acquire ID" earlier than user A. In this case, how can user A and user B be distinguished? The users may be distinguished through interaction between the administrator and the users. For example, the administrator sets the quantity of allocated IDs to 1; when user B clicks "Acquire ID" earlier than user A, the mobile phone of user B prompts "Acquiring an ID", and the mobile phone of user A prompts "Acquiring an ID fails". In this case, it is displayed on an administrator operation interface that a user is acquiring an ID. User A tells the administrator that acquiring an ID fails. Obviously, the ID being acquired is not an ID of user A, but an ID of illegal user B. In this case, the administrator interrupts the acquisition of an ID without hesitation, and clicks to refuse acquiring an ID, and the mobile phone of user B prompts "Acquiring an ID is refused". Then the mobile phone of user B can retry only after waiting for a period of time, but user A can retry immediately. The retry process is the same as that described above. If ID allocation is authorized successfully, S108 is performed. If ID allocation fails to be authorized, S109 is performed.

S108. The mobile phone photonic client performs channel decryption and source decryption on the acquired data. The decryption method is symmetric to the foregoing encryption method. After a plain text is obtained through decryption, "Acquiring an ID succeeds" is prompted.

S109. The mobile phone photonic client prompts "Acquiring an ID fails".

S110. The mobile phone photonic client may be set to retry acquiring an ID after a period of time.

S111. Save the ID that is generated by decrypted, and when the ID is saved, AES encryption needs to be performed on the ID by using a unique identity of the mobile phone as a key.

In other embodiments, the password for administrator to log in to the identification code allocation server may also be generated dynamically. The login may be implemented by the administrator by inputting the password and a verification code, that is, the password keeps unchanged, and the verification code changes each time.

In this embodiment, an Advanced Encryption Standard (AES) encryption is used, and a unique identity of the mobile phone is used as a key to perform encryption to avoid information fraud. A Java SSH three-layer architecture model is used to support an application platform of the website to ensure quality and reuse of programs. An interactive ID allocation process ensures uniqueness of an allocated ID.

In a embodiment, the identification code allocation server includes a QR code generation module. The identification code allocation server generates, according to an identification code acquisition request input by a user, a bound verification code and identification code, generates a QR code of the verification code according to the verification code by using the QR code generation module, and displays the QR code of the verification code; the mobile terminal includes a QR code scanning module, and the mobile terminal scans the QR code of the verification code by using the QR code scanning module to extract the verification code, and sends a request for acquiring the identification code corresponding to the verification code to the identification code allocation server, where the identification code acquisition request sent by the mobile terminal includes the verification code that is extracted by the mobile terminal from the QR code and identity information of the mobile terminal. After receiving the identification code acquisition request sent by the mobile terminal, the identification code allocation server sends the identification code corresponding to the verification code to the mobile terminal. A specific process of this embodiment is as follows:

S201. After uploading mobile phone photonic client software to an application store, generate a QR code of a download website by using a QR code generation tool. A mobile phone scans the generated QR code by using a QR code scanning tool, and obtains the download website. The mobile phone photonic client software may be downloaded by clicking "Download". Then the software is installed. When the software is installed for the first time, there is no ID information. Therefore, "Acquire an ID by setting" is prompted.

S202. Configure a database, create a database instance, and create a database table for storing an ID.

S203. Implement an ID allocation function by using a popular three-layer architecture webservice+Spring+Hibernate of a Java platform website, implement an ID management function of the website by using a three-layer architecture Struts+Spring+Hibernate, and perform source encryption and channel encryption on communication data, where an AES encryption algorithm is used for source encryption, and an SSL encryption algorithm is used for channel encryption.

S204. To ensure security of an administrator, the administrator must log in by using a password, and can change the password. The password is generated dynamically, which is implemented by the administrator by inputting the password and a verification code, that is, the password keeps unchanged, and the verification code changes each time.

S205. Determine whether the password is consistent. If the password is consistent, it indicates that the one currently logging in is an administrator. If the password is inconsistent, an input error may occur, or the one currently logging in is not an administrator. To avoid a third-party attack, the number of allowed password retries is set to 5, so that an account is locked if the number of password retries exceeds 5. Each administrator maintains a login password. A length, complexity, and periodicity of the password may be set. For example, the length of the password is set to 10 characters, including numbers, letters, and special symbols, and the password should be changed every month. If the administrator forgets the password, the administrator may tell a cloud administrator to reset the password.

S206. The administrator sends a request to a web server by using a web browser or another client. The web server randomly generates one or more verification codes at the back end and randomly generates one or more IDs, and binds the generated verification code with the ID, and then generates a QR code by using a QR code generation tool.

S207. A mobile phone photonic client scans the QR code of the verification code by using a QR code decoding tool, and extracts the verification code. After "Acquire ID" is clicked on the mobile phone photonic client, the administrator can prompt, on the website of the server, that a mobile phone is acquiring an ID.

S208. To allow only one mobile phone to acquire an ID each time, the quantity of allocated IDs is set to one. When a mobile phone is acquiring an ID, it is possible that another illegal user that has downloaded mobile phone software is also acquiring an ID. For example, user A is a dweller in a community, user B is not a dweller in the community, and user B clicks "Acquire ID" earlier than user A. In this case, how can user A and user B be distinguished? The users may be distinguished through interaction between the administrator and the users. For example, the administrator sets the quantity of allocated IDs to 1; when user B clicks "Acquire ID" earlier than user A, the mobile phone of user B prompts "Acquiring an ID", and the mobile phone of user A prompts "Acquiring an ID fails". In this case, it is displayed on an administrator operation interface that a user is acquiring an ID. User A tells the administrator that acquiring an ID fails. Obviously, the ID being acquired is not an ID of user A, but an ID of illegal user B. In this case, the administrator interrupts the acquisition of an ID without hesitation, and clicks to refuse acquiring an ID, and the mobile phone of user B prompts "Acquiring an ID is refused". Then the mobile phone of user B can retry only after waiting for a period of time, but user A can retry immediately. The retry process is the same as that described above. If ID allocation is authorized successfully, S209 is performed. If ID allocation fails to be authorized, S210 is performed.

S209. The mobile phone photonic client performs channel decryption and source decryption on the acquired data. The decryption method is symmetric to the foregoing encryption method. After a plain text is obtained through decryption, "Acquiring an ID succeeds" is prompted.

S210. The mobile phone photonic client prompts "Acquiring an ID fails".

S211. The mobile phone photonic client may be set to retry acquiring an ID after a period of time.

S212. Save the ID that is generated and decrypted, and when the ID is saved, AES encryption needs to be performed on the ID by using a unique identity of the mobile phone as a key.

In this embodiment, the QR code generation and decoding tools need to be used to download the mobile phone photonic client software, and the QR code generation and decoding tools also need to be used when a verification code is used to perform communication with the website. The administrator password is generated dynamically to maximally ensure security of the ID allocated to the administrator. A high-security AES encryption and decryption algorithm is used, and a unique identity of the mobile phone is used as a key to perform encryption to avoid information fraud. A Java SSH three-layer architecture model is used to support an application platform of the website to ensure quality and reuse of programs. An interactive ID allocation process ensures uniqueness of an allocated ID.

In another specific instance, the identification code allocation server generates, according to a mobile terminal number (for example, a mobile phone number) input by the user, a unique identification code corresponding to the mobile terminal number, and the mobile terminal obtains the identification code from the identification code allocation server by sending an identification code acquisition request that carries the mobile terminal number. A specific process of this embodiment is as follows:

S301. Configure a database, create a database instance, and create a database table for storing an ID.

S302. Use a popular three-layer model of a .net platform website: 1. View layer: use a configuration file for implementation; 2. Model layer: compile all entity classes and service logic; 3. Control layer: implement redirection of different results according to the service logic of the model layer. Implement an ID allocation function, implement an ID management function of the website by using the foregoing model, and perform source encryption and channel encryption on communication data, where an AES encryption algorithm is used for source encryption, and an SSL encryption algorithm is used for channel encryption.

S303. A login portal must be set before a mobile phone communicates with an Internet server. For example, an Internet router is connected to the Internet, and then the mobile phone is connected to the Internet router.

S304. To ensure security of the administrator, before operating ID allocation software, the administrator must log in by inputting a password, and can change the password. This password is static, that is, the password for login each time is consistent.

S305. Determine whether the password is consistent. If the password is consistent, it indicates that the one currently logging in is an administrator. If the password is inconsistent, an input error may occur, or the one currently logging in is not an administrator. To avoid a third-party attack, the number of allowed password retries is set to 5, so that an account is locked if the number of password retries exceeds 5. Each administrator maintains a login password. A length, complexity, and periodicity of the password may be set. For example, the length of the password is set to 10 characters, including numbers, letters, and special symbols, and the password should be changed every month. If the administrator forgets the password, the administrator may tell a cloud administrator to reset the password.

S306. The administrator inputs a unique identity IMSI of the mobile phone by using the ID allocation software, and then clicks "Generate", and then an unused random ID may be generated and bound with the mobile phone number.

S307. A mobile phone photonic client acquires the unique identity IMSI of the mobile phone by using a program. After an "Acquire ID" button is clicked on the mobile phone photonic client, the mobile phone photonic client sends an HTTP request carrying the mobile phone number to a web server.

S308. After receiving the HTTP request, the web server performs the following processing: first determining whether the received IMSI is recorded in a binding list generated in S106; and if the IMSI is recorded, extracting the ID corresponding to the IMSI, and returning the ID to a photonic key of the mobile phone, and going to S309; or if the IMSI is not recorded, returning authorization failure information, and going to S310.

S309. The mobile phone photonic client acquires data through the network, and prompts "Acquiring an ID succeeds".

S310. The mobile phone photonic client acquires data through the network, and prompts "Acquiring an ID fails".

S311. The mobile phone photonic client may be set to retry acquiring an ID after a period of time.

S312. Save the ID that is generated and decrypted, and when the ID is saved, AES encryption needs to be performed on the ID by using a unique identity of the mobile phone as a key.

In this embodiment, the administrator password is generated dynamically to maximally ensure security of the ID allocated to the administrator, a high-security AES encryption and decryption algorithm is used, and a unique identity of the mobile phone is used as a key to perform encryption to avoid information fraud. To control the allocation process, the administrator registers an IMSI of a user beforehand, and binds the IMSI with an ID. Later, when the user uses the mobile phone photonic key to request an ID, an ID is allocated for each IMSI. The web server uses a three-layer architecture of a .net platform to support an application platform of the website to ensure quality and reuse of programs. An interactive ID allocation process ensures uniqueness of an allocated ID.

Embodiment 4

A difference from Embodiment 3 lies in that an identification code allocation device is a host computer, where the host computer generates and deletes an identification code by using software. In this embodiment, a transmitter may be a mobile phone photonic client, a light pen photonic client, or the like, and the transmitter is connected to the host computer by using a data line to acquire an identification code. Using a mobile phone photonic client as an example, a specific process of this embodiment is as follows:

S101. Configure a database, create a database instance, and create a database table for storing an ID.

S102. Compile ID allocation software for a host computer by using Visual C#2008, randomly select a unique ID and an administrator password from a mysql database, perform AES encryption on the ID and administrator password, and save the ID and administrator password to a file in a memory card of a mobile phone.

S103. Install mobile phone photonic client software on a mobile phone from an application store or an optical disc. Then an administrator inputs the administrator password that is generated by the ID allocation software of the host computer beforehand.

S104. A mobile phone photonic client decrypts the encrypted file that is generated just now in the memory card, and compares the input administrator password with the decrypted administrator password. If the password is correct, S105 is performed. If the password is incorrect, S106 is performed.

S105. Click an "Acquire ID" button on the mobile phone photonic client, and perform AES decryption on the encrypted file that is generated just now in the memory card.

S106. Select whether to retry inputting the administrator password, and if yes, go to S103, or otherwise, end the process.

S107. Save the ID that is generated by decryption, and when the ID is saved, AES encryption needs to be performed on the ID by using a unique identity of the mobile phone as a key.

In this embodiment, a high-security AES encryption and decryption algorithm is used, and a unique identity of the mobile phone is used as a key to perform encryption to avoid information fraud.

In the foregoing embodiments, the identification code allocation device and the access control management server may be two independent devices that may perform data communication with each other, or may be integrated into one device.

When the authentication system is applied to other systems that require authorization, the principle and working process of the authentication system are similar. For example, the authentication system is a ticket system or a metro system. The ticket system or the metro system further includes a gate, where the controller is further communicatively connected to the gate, and after performing a second right authentication on transmitter information, the controller determines whether to output a gate control signal to the gate to control the gate to open according to an authentication result; or the authentication system is a transaction system. the transaction system further includes a cash register or a POS machine, where the controller is further communicatively connected to the cash register or the POS machine, and after performing a second right authentication on transmitter information, the controller determines, according to an authentication result, whether to output a cash control signal to the cash register or the POS machine to control the cash register or the POS machine to pay or receive cash. The specific process is not further described herein.

Although detailed descriptions of the present invention are further provided with reference to specific embodiments above, it cannot be considered that specific implementation of the present invention is limited to those descriptions. A person of ordinary skill in the technical field of the present invention may further make several simple derivations or replacements without departing from the conception of the invention.

INDUSTRIAL APPLICABILITY

In the embodiments of the present invention, a security risk caused by uncontrolled transmission of a light signal of an identification code of a transmitter by the transmitter is reduced. After the transmitter transmits the light signal of the identification code of the transmitter, a receiver performs a second right authentication on the received light signal. In this way, security of an authentication system is further improved.

What is claimed is:

1. A method for right authentication in an authentication system, wherein the authentication system comprises a transmit terminal and a receive terminal, and the transmit terminal comprises a transmitter, the receive terminal comprises a receiver and a controller that are connected, and the method comprises:

externally propagating, by the receiver, an acquired identification code information set corresponding to the receiver;

after receiving the identification code information set transmitted by the receiver, performing a first right authentication on whether the transmitter has operation rights by the transmitter according to the received identification code information set, and determining whether to allow converting transmitter information of the transmitter into a light signal for transmission according to an authentication result, where the transmitter information comprises at least a unique identification code of the transmitter;

wherein the first right authentication includes the following steps:

comparing the unique identification code of the transmitter with the received identification code information set, and if the received identification code information set comprises the unique identification code of the transmitter, controlling a light transmit device to switch to a enable state that allows converting transmitter information of the transmitter into the light signal for transmission;

after the receive terminal receives, by using a light receive device, the transmitter information that is transmitted by the transmitter in a light signal form, performing a second right authentication on the transmitter information by the controller;

wherein the second right authentication includes the following steps:

comparing a transmitter information with the identification code information set, and if the identification code information set includes the transmitter information, outputting a first control signal to a controllable lock to control unlocking of the controllable lock;

wherein the identification code information set comprises the unique identification code information of all transmitters corresponding to the receiver, wherein the all transmitters have rights to open a door controlled by the receiver;

wherein the transmitter further includes a power supply, a trigger switch, a control switch and a processor, where the trigger switch and the control switch are wired in series between the power supply and the light transmit device; a control end of the control switch is coupled to the processor, and the control switch switches between an on state and an off state according to a control signal output by the processor; the trigger switch is configured to switch between an on state and an off state in response to an operation of a user; and wherein the receiver performs encrypting the identification code information set, and when the transmitter receives the encrypted identification code information set transmitted by the receiver, the transmitter performs decrypting the identification code information set.

2. The method according to claim 1, wherein the authentication system is an access control system, a consumption management system, or a metro system, the authentication system further comprises an access control switch apparatus configured to switch between an on state and an off state, and after the second right authentication is performed on the transmitter information, the controller determines, according to an authentication result, whether to output a control signal to control turn-on of the access control switch apparatus.

3. The method according to claim 1, wherein the transmit terminal is a mobile terminal, and the unique identification code of the transmit terminal is allocated according to the following steps:

sending an identification code acquisition request to an identification code allocation server through the Internet or a local area network, wherein the identification code acquisition request comprises information associated with the mobile terminal; and sending the unique identification code to the mobile terminal associated with the request by the identification code allocation server according to the identification code acquisition request.

4. The method according to claim 3, wherein the step that the sending the unique identification code to the mobile terminal by the identification code allocation server according to the identification code acquisition request comprises:

generating a binding between a verification code and the unique identification code by the identification code allocation server according to the identification code acquisition request input by a user;

generating a Quick Response code of the verification code according to the verification code by using a QR code generation device, and displaying the QR code; the mobile terminal comprises a QR code scanning device, and the mobile terminal scans the QR code of the verification code by using the QR code scanning device to extract the verification code;

receiving the identification code acquisition request sent by the mobile terminal, wherein the unique identification code acquisition request sent by the mobile terminal comprises the verification code that is extracted by the mobile terminal from the QR code and identity information of the mobile terminal; and sending the unique identification code corresponding to the verification code to the mobile terminal by the identification code allocation server.

5. A right authentication method for a transmit terminal, wherein a authentication system comprises the transmit terminal and a receive terminal, and the transmit terminal comprises a transmitter, the receive terminal comprises a receiver and a controller that are connected, and the method comprising:

receiving an identification code information set transmitted by a receiver;

performing a first right authentication on whether the transmit terminal has operation rights according to the received identification code information set;

determining whether to allow converting transmitter information of the transmit terminal into a light signal for transmission according to an authentication result, where the transmitter information comprises at least a unique identification code corresponding to the transmit terminal;

wherein the identification code information set comprises unique identification code information of all transmitters corresponding to the receiver, the all transmitters have rights to open a door controlled by the receiver;

the first right authentication includes the following steps:

comparing the unique identification code of the transmitter with the received identification code information set, and if the received identification code information set comprises the unique identification code of the transmitter, controlling a light transmit device to switch to a enable state that allows converting transmitter information of the transmitter into the light signal for transmission;

after the receive terminal receives, by using a light receive device, the transmitter information that is transmitted by the transmitter in a light signal form, performing a second right authentication on the transmitter information by the controller;

wherein the second right authentication includes the following steps:

comparing a transmitter information with the identification code information set, and if the identification code information set includes the transmitter information, outputting a first control signal to a controllable lock to control unlocking of the controllable lock;

wherein the transmitter further includes a power supply, a trigger switch, a control switch and a processor, where the trigger switch and the control switch are wired in series between the power supply and the light transmit device; a control end of the control switch is coupled to the processor, and the control switch switches between an on state and an off state according to a control signal output by the processor; the trigger switch is configured to switch between an on state and an off state in response to an operation of a user; and wherein the receiver performs encrypting the identification code information set, and when the transmitter receives the encrypted identification code information set transmitted by the receiver, the transmitter performs decrypting the identification code information set.

6. The method according to claim 5, wherein the identification code information set comprises unique identification code information of all transmitters corresponding to the receiver, and the first right authentication comprises:

comparing a unique identification code of the transmitter with the received identification code information set by a transmitter;

if the received identification code information set comprises an identification code that is the same as the unique identification code of the transmitter, allowing converting the transmitter information of the transmit terminal into a light signal for transmission by using a light transmit device; or the identification code information set comprises identity information of a receive terminal, the transmit terminal stores identity information of all receive terminals that the transmit terminal has rights to operate, and the first right authentication comprises:

comparing the received identification code information set with the identity information of all the receive terminals that the transmit terminal has the rights to operate which is stored by the transmit terminal, and if the identity information of all the receive terminals that the transmit terminal has the rights to operate which is stored by the transmit terminal comprises the identification code information set, allowing converting the transmitter information of the transmit terminal into a light signal for transmission by using a light transmit device.

7. The method according to claim 5, wherein after the transmit terminal passes the first right authentication, the method comprises:

detecting a light transmission trigger signal input by a user; and controlling the light transmit device to convert the transmitter information of the transmit terminal into a light signal for transmission according to the light transmission trigger signal.

8. The method according to claim 7, wherein after the transmit terminal passes the first right authentication, the method further comprises:

starting a timer, and after the timer expires, forbidding converting the transmitter information of the transmit terminal into a light signal for transmission by using the light transmit device.

9. The method according to claim 1, wherein the authentication system is a transaction system, and the transaction system further comprises a cash register or a POS machine, and after the second right authentication is performed according to the transmitter information, the controller determines whether to output a cash control signal to the cash register or the POS machine to control the cash register or the POS machine to pay or receive cash according to an authentication result.

* * * * *